United States Patent
Yu

(12) United States Patent  (10) Patent No.: US 8,287,781 B2
Yu  (45) Date of Patent: Oct. 16, 2012

(54) IMPRINTING METHOD FOR MAKING OPTICAL COMPONENTS

(75) Inventor: Tai-Cherng Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 510 days.

(21) Appl. No.: 12/579,475

(22) Filed: Oct. 15, 2009

(65) Prior Publication Data

US 2010/0244291 A1    Sep. 30, 2010

(30) Foreign Application Priority Data

Mar. 30, 2009    (CN) .......................... 2009 1 0301201

(51) Int. Cl.
- *B28B 7/30* (2006.01)
- *B28B 11/08* (2006.01)
- *B29C 45/76* (2006.01)
- *B29C 59/00* (2006.01)
- *B29D 11/00* (2006.01)

(52) U.S. Cl. .......... 264/1.7; 264/1.1; 264/293; 264/313; 264/40.1

(58) Field of Classification Search .................. None
See application file for complete search history.

(56) References Cited

U.S. PATENT DOCUMENTS

| 6,156,243 | A | * | 12/2000 | Kosuga et al. | 264/2.5 |
| 6,525,805 | B2 | * | 2/2003 | Heinle | 355/53 |
| 2002/0109825 | A1 | * | 8/2002 | Gui et al. | 355/53 |
| 2006/0032437 | A1 | * | 2/2006 | McMackin et al. | 118/100 |
| 2006/0226560 | A1 | * | 10/2006 | Yu | 264/1.32 |
| 2007/0104813 | A1 | * | 5/2007 | Wuister et al. | 425/174.4 |
| 2007/0266875 | A1 | * | 11/2007 | Berge | 101/481 |
| 2008/0068720 | A1 | * | 3/2008 | Shigemura et al. | 359/628 |
| 2009/0072418 | A1 | * | 3/2009 | Chang et al. | 264/1.7 |
| 2009/0190227 | A1 | * | 7/2009 | Yu | 359/619 |
| 2009/0256273 | A1 | * | 10/2009 | Yu | 264/2.7 |
| 2010/0230836 | A1 | * | 9/2010 | Yu | 264/1.32 |
| 2010/0247699 | A1 | * | 9/2010 | Yu | 425/150 |
| 2010/0270692 | A1 | * | 10/2010 | Yu | 264/1.38 |

* cited by examiner

*Primary Examiner* — Christina Johnson
*Assistant Examiner* — Benjamin Schiffman
(74) *Attorney, Agent, or Firm* — Altis Law Group, Inc.

(57) ABSTRACT

An imprinting method for making optical components includes: providing an imprinting mold, the imprinting mold comprising a molding surface and a molding portion formed on the molding surface; providing a substrate comprising a first surface, the first surface comprising a plurality of supporting areas arranged in an array, each of the supporting areas configured for supporting a mass of molding material; applying a mass of molding material on each of the supporting areas; pressing the imprinting mold on each mass of the molding material; and solidifying the imprinted molding material to form the optical components.

4 Claims, 6 Drawing Sheets

IMPRINTING METHOD FOR MAKING OPTICAL COMPONENTS

BACKGROUND

1. Technical Field

The present disclosure relates to an imprinting method for making optical components.

2. Description of Related Art

Imprinting technology is a simple process with low cost, high throughput and high resolution. Imprinting technology is widely used for making an optical component, such as a lens in wafer lens package (WLP) process.

In an imprinting method, an imprinting mold is used. The imprinting mold is made having dimensions close to dimensions of a silicon substrate. Molding material is approximately coated on an entire surface of the substrate, and then the imprinting mold is pressed on the molding material on the substrate. The imprinted molding material is then solidified to form numerous optical components. However, the imprinting mold having dimensions close to those of the substrate is hard to make and costs much. Further, since the molding material is approximately coated on the entire surface of the substrate, the solidified molding material between two adjacent optical components are wasted.

Therefore, an imprinting method for making optical components, which can overcome the above mentioned problems, is desired.

DETAILED DESCRIPTION

Figure 1:
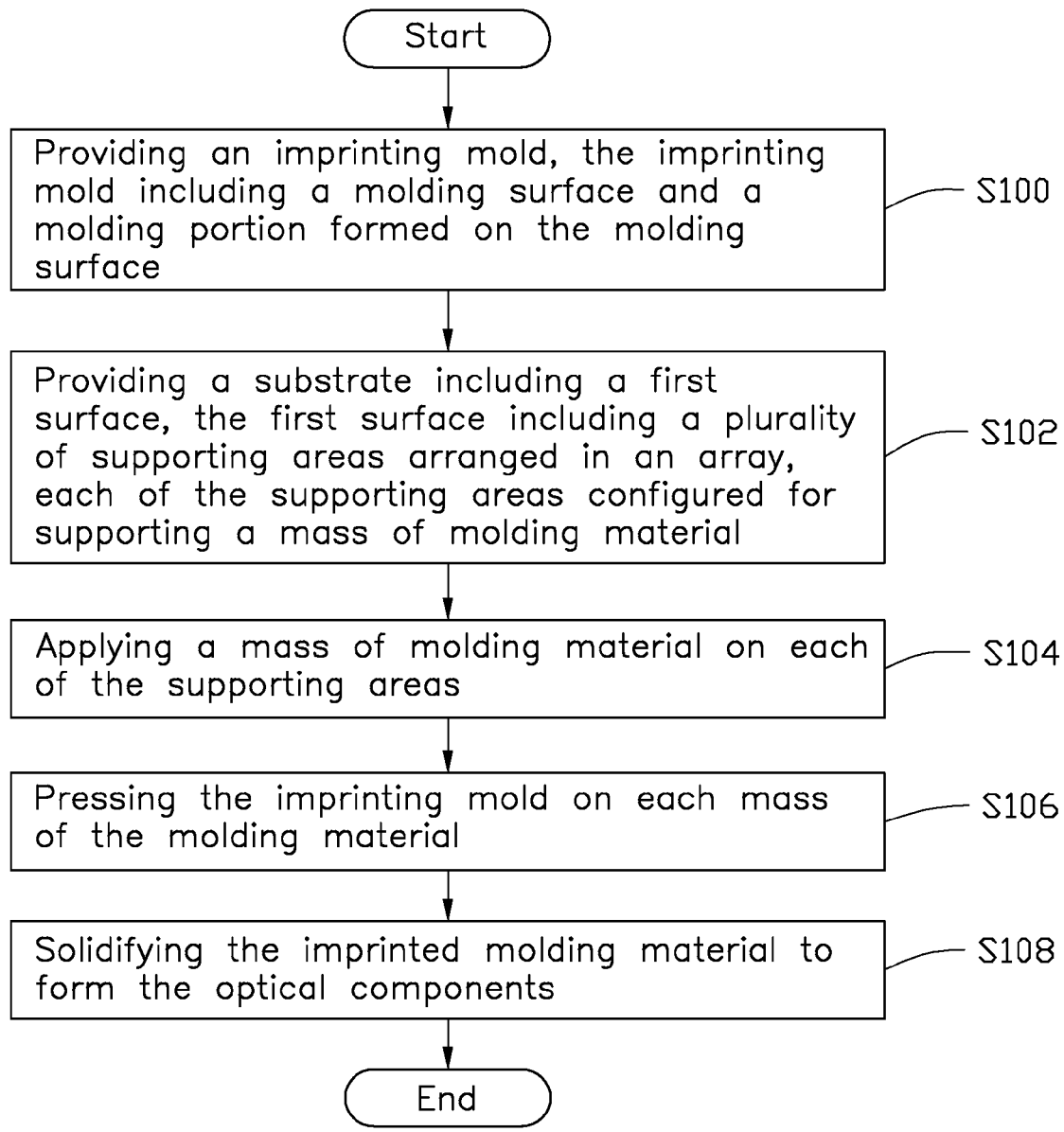
FIG. 1 is a flow chart of an imprinting method for making optical components, according to a first exemplary embodiment.

Referring to FIG. 1, an imprinting method for making optical components, according to a first exemplary embodiment, includes steps S100 through S108. Step S100: providing an imprinting mold, the imprinting mold including a molding surface and a molding portion formed on the molding surface. Step S102: providing a substrate including a first surface, the first surface including a plurality of supporting areas arranged in an array, each of the supporting areas configured for supporting a mass of molding material. Step S104: applying a mass of molding material on each of the supporting areas. Step S106: pressing the imprinting mold on each mass of the molding material. Step S108: solidifying the imprinted molding material to form the optical components.

Figure 2:
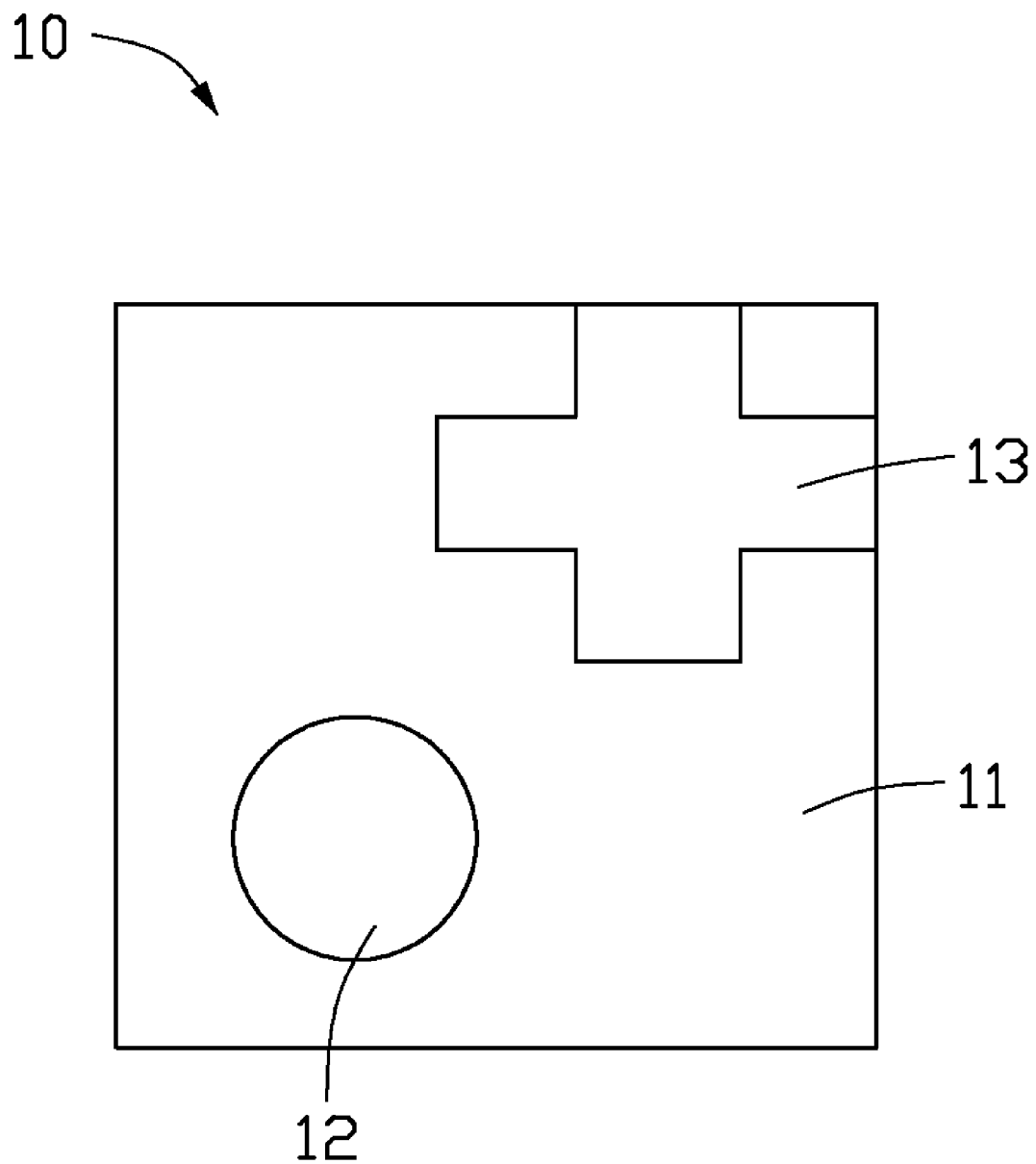
FIG. 2 is a schematic view of an imprinting mold used in the imprinting method of FIG. 1.

In step S100, for example, the imprinting mold 10 can be used for making a lens. A material of the imprinting mold 10 is selected from the group consisting of silicon, tungsten carbide, silicon carbide, silicon nitride, titanium carbide, and tungsten-cobalt alloy carbide. Referring to FIG. 2, the imprinting mold 10 includes the molding surface 11 and the molding portion 12 formed on the molding surface 11. The molding surface 11 is substantially rectangular and an area of the molding surface 11 may be two to four times as large as that of the molding portion 12.

A first alignment mark 13 is formed on the molding surface 11 with a location different from that of the molding portion 12. In this embodiment, the first alignment mark 13 is positioned at an upper right corner of the molding surface 11 and the molding portion 12 is positioned at a lower left corner of the molding surface 11. The first alignment mark 13 is a cross-shaped recess defined in the molding surface 11.

Figure 3:
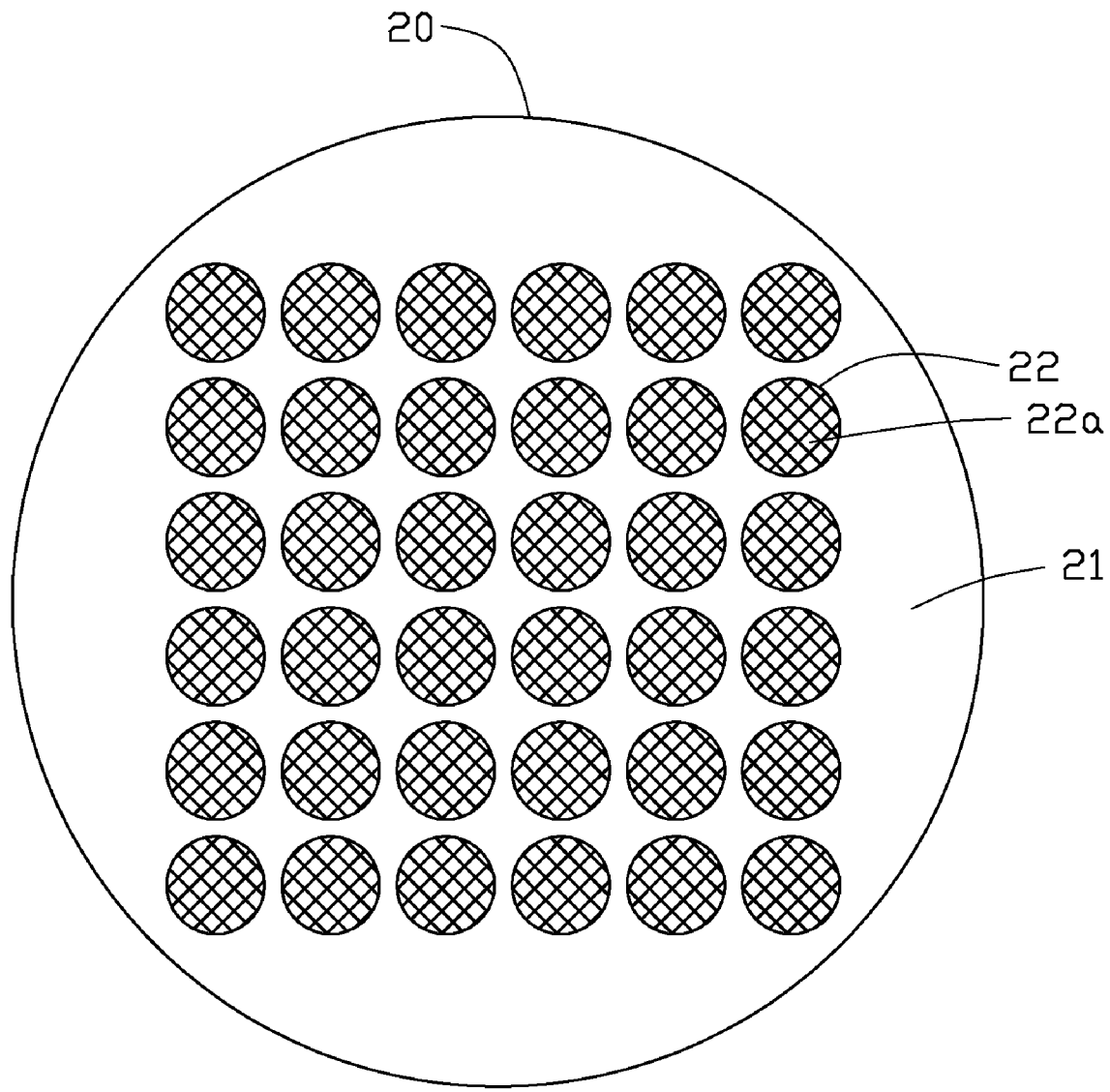
FIG. 3 is a schematic view of a substrate including a first surface used in the imprinting method of FIG. 1.

In step S102, referring to FIG. 3, the substrate 20 includes the first surface 21. The plurality of supporting areas 22 are arranged in a 6×6 array on the first surface 21 in this embodiment. The supporting areas 22 are spaced from each other. An area of each of the supporting areas 22 is slightly larger than that of the molding surface 11. Therefore, the imprinting mold 10 can be fully pressed on the supporting area 22. The supporting area 22 is configured for supporting the mass of the molding material 22a. In step S104, the molding material 22a is a photo-curable material, such as epoxy resin, acrylic resin, polyurethane or polysilicone resin. A thickness of the molding material 22a on each supporting area 22 is slightly larger than that of the lens to be made.

It is to be understood that in other alternative embodiments, the supporting areas 22 can be arranged in a 5×5 or 8×8 array, depending upon a practical use.

The substrate 20 is a transparent substrate and can be made from quartz, or glass.

Figure 4:
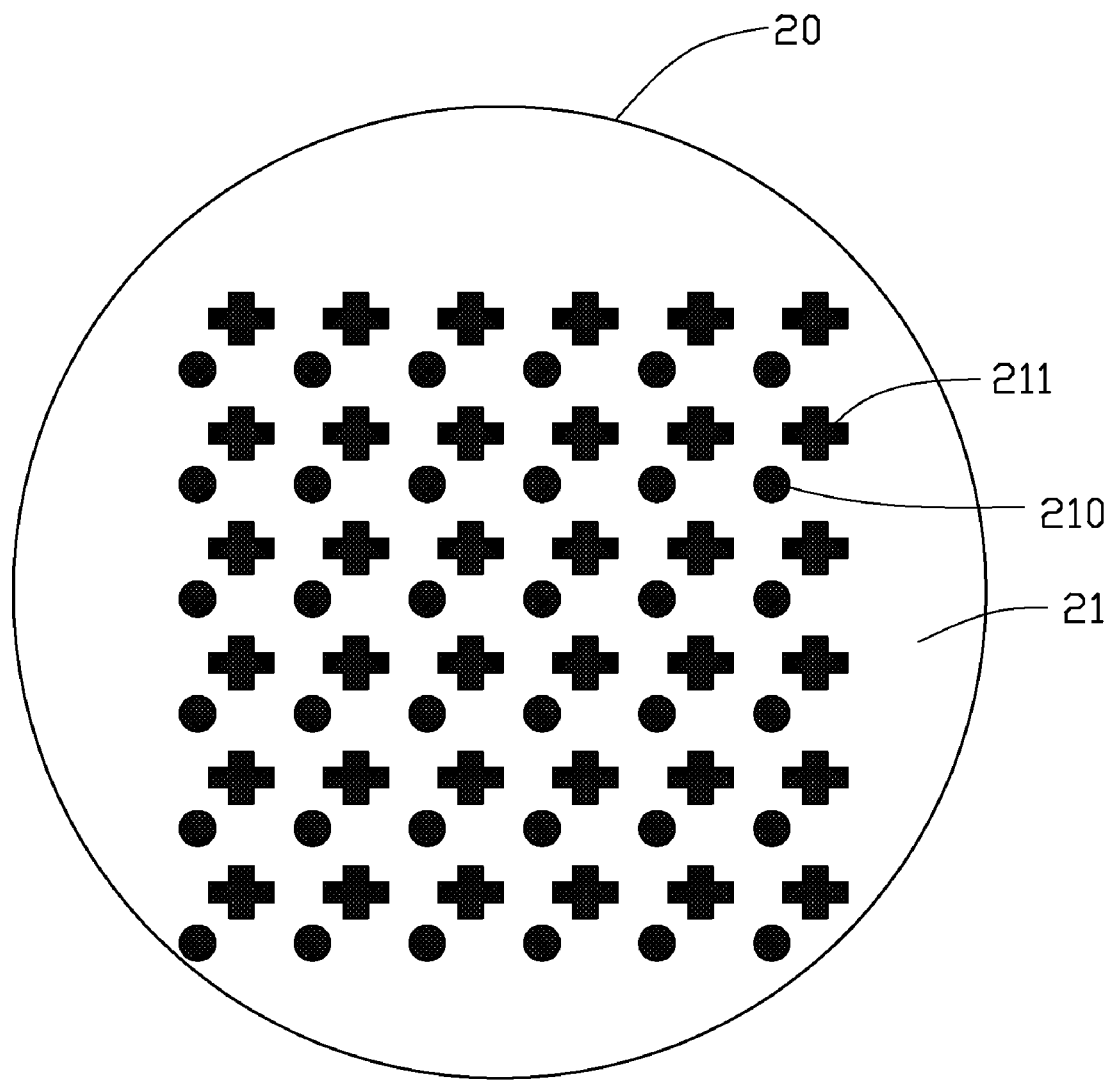
FIG. 4 is a schematic view of a plurality of optical components formed on the first surface of the substrate of FIG. 3.

Referring to FIG. 4, the imprinting mold 10 is pressed on each mass of the molding material 22a on each of the supporting areas 22 so that pattern of the molding portion 12 and the first alignment mark 13 are replicated on the imprinted molding material. The imprinted molding material is then solidified using ultraviolet light to form the optical components 210 and a plurality of cross-shaped second alignment marks 211 on the first surface 21 of the substrate 20.

Since the imprinting mold 10 is much smaller than the substrate 20, the imprinting mold 10 is easy to make and costs less. Further, the molding material 22a is only applied on the supporting areas 22. Therefore, an amount of the molding material 22a is conserved. Since the masses of the molding material 22a are spaced from each other, space between two adjacent masses of the molding material 22a can be used for excess molding material so that the optical components 210 made by the imprinting method can be accurately obtained as designed.

Figure 5:
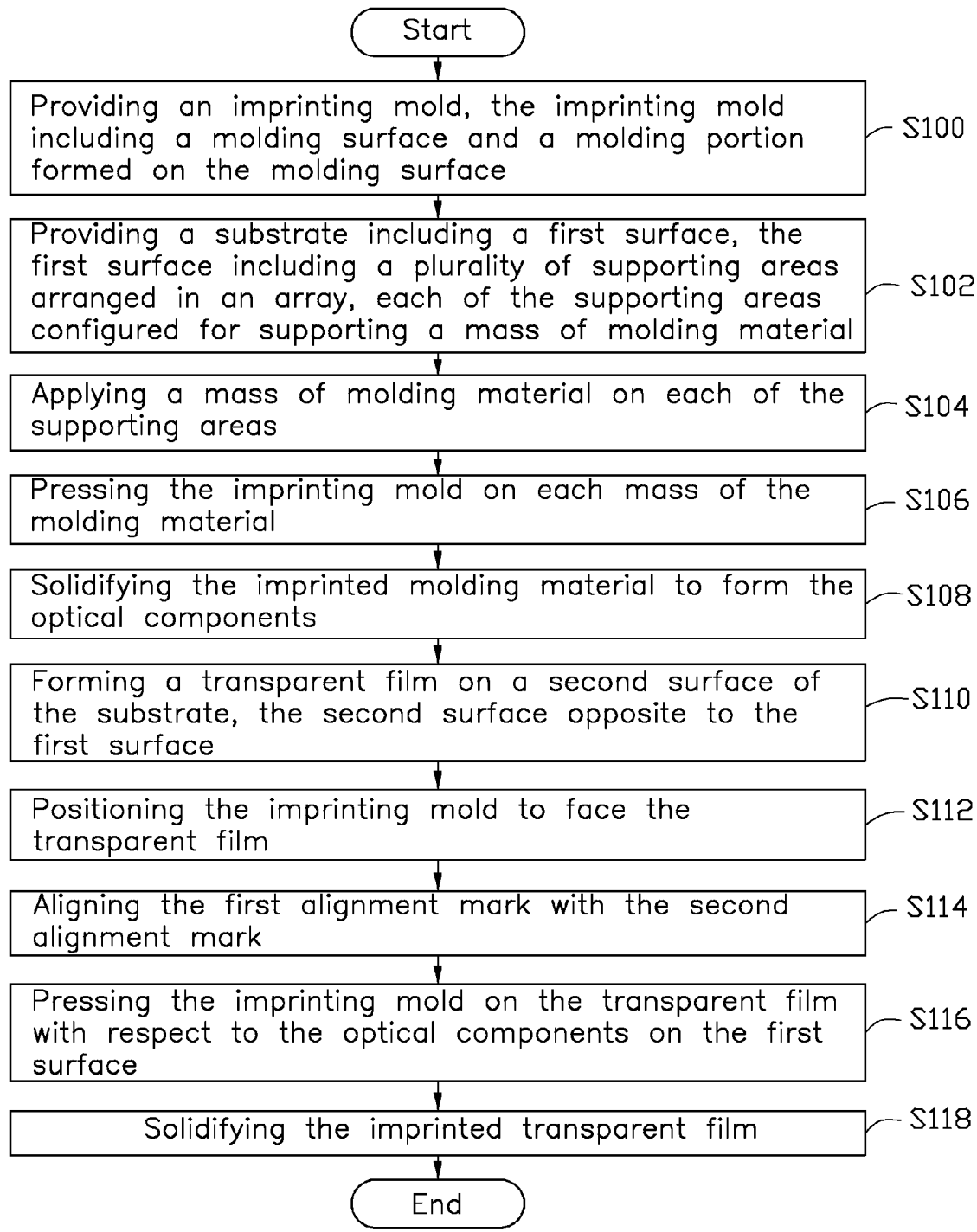
FIG. 5 is a flow chart of an imprinting method for making optical components, according to a second exemplary embodiment.
Figure 6:
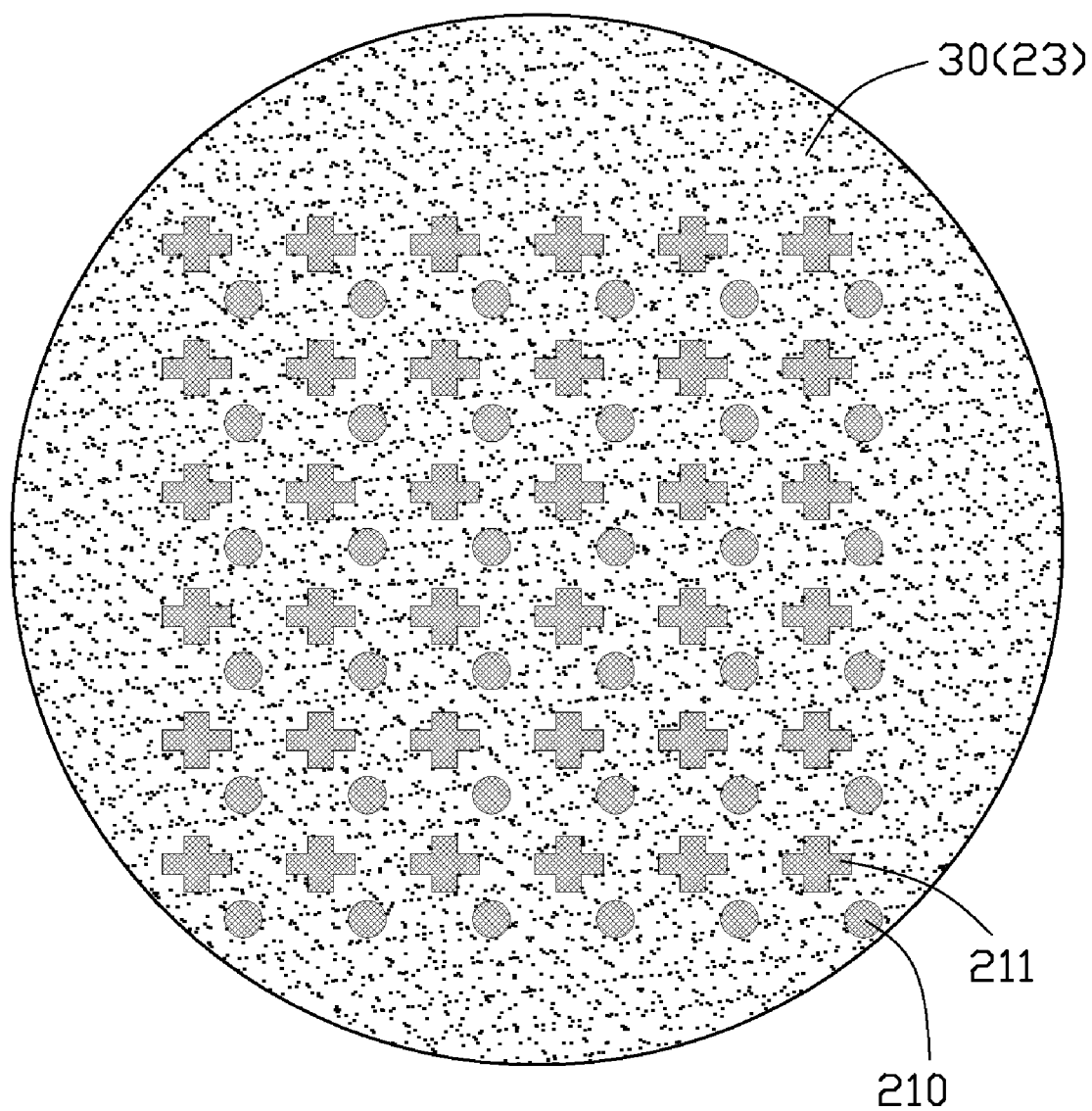
FIG. 6 is a schematic view of a transparent film formed on a second surface of a substrate used in the imprinting method of FIG. 5.

Referring to FIGS. 5 and 6, an imprinting method for making dual-side optical components according to a second embodiment, is shown. Differences between the imprinting method of this embodiment and the imprinting method of the first embodiment are that the imprinting method of this embodiment further includes steps S110 through S118 after step S108.

Step S110: forming a transparent film on a second surface of the substrate, the second surface opposite to the first surface. Step S112: positioning the imprinting mold to face the transparent film. Step S114: aligning the first alignment mark with the second alignment mark. Step S116: pressing the imprinting mold on the transparent film with respect to the optical components on the first surface. Step S118: solidifying the imprinted transparent film.

In step S110, the substrate 20 is turned over, and then the transparent film 30 is formed by coating. A material of the transparent film 30 is selected from the group consisting of dimethyl silicone polymer, photosensitive resin, and polymethyl methacrylate. The transparent film 30 can be coated on the second surface 23 of the substrate 20 by spin-coating or spray coating. A thickness of the transparent film 30 can be determined according to a practical use.

In step S114, referring to FIGS. 2 and 6, since the substrate 20 and the film 30 are transparent, the optical components 210 and the second alignment mark 211 on the first surface 21 can be seen from the second surface 23. When making other optical components on the second surface 23 of the substrate 20, the imprinting mold 10 are positioned to face the transparent film 30, with the molding portion 12 and the first alignment mark 13 of the imprinting mold 10 aligned with the optical component 210 and the second alignment mark 211, and then the imprinting mold 10 is pressed on the transparent film 30. The imprinted transparent film 30 is then solidified. As a result, other optical components on the second surface 23 of the substrate 20 are made.

Since the second alignment mark 211 is formed on the first surface 21 of the substrate 20, alignment of the lenses on two surfaces 21, 23 of the substrate 20 is easily achieved. This can avoid or at least alleviate decentration of the lenses formed on two surfaces 21, 23 of the substrate 20.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An imprinting method for making optical components, comprising:
    providing an imprinting mold, the imprinting mold comprising a molding surface, a molding portion formed on the molding surface, a first alignment mark formed on the molding surface with a location different from that of the molding portion;
    providing a transparent substrate comprising a first surface, the first surface comprising a plurality of supporting areas arranged in an array, each of the supporting areas configured for supporting a mass of molding material;
    applying a mass of molding material on each of the supporting areas;
    pressing the imprinting mold on each mass of the molding material;
    solidifying the imprinted molding material to form the optical components and a second alignment mark, the second alignment mark being formed on the first surface of the substrate by the first alignment mark;
    forming a transparent film on a second surface of the substrate, the second surface opposite to the first surface;
    positioning the imprinting mold to face the transparent film;
    aligning the first alignment mark with the second alignment mark;
    pressing the imprinting mold on the transparent film with respect to the optical components on the first surface; and
    solidifying the imprinted transparent film.

2. The imprinting method of claim 1, wherein the first alignment mark is a cross-shaped recess defined in the molding surface.

3. The imprinting method of claim 1, wherein a material of the transparent film is selected from the group consisting of dimethyl silicone polymer, photosensitive resin, and polymethyl methacrylate.

4. The imprinting method of claim 1, wherein a material of the imprinting mold is selected from the group consisting of silicon, tungsten carbide, silicon carbide, silicon nitride, titanium carbide, and tungsten-cobalt alloy carbide.

* * * * *